United States Patent [19]
Wright

[11] Patent Number: 5,620,391
[45] Date of Patent: Apr. 15, 1997

[54] DOWNSHIFT LOGIC FOR SEMI-AUTOMATIC MECHANICAL TRANSMISSION WITH MANUAL CLUTCH CONTROLLER

[75] Inventor: Keith Wright, Preston, England

[73] Assignee: Eaton Corporation, Cleveland, Ohio

[21] Appl. No.: 511,773

[22] Filed: Aug. 7, 1995

[30] Foreign Application Priority Data

Aug. 19, 1994 [GB] United Kingdom .................. 9416840

[51] Int. Cl.$^6$ ........................................... B60K 41/24
[52] U.S. Cl. ................... 477/78; 477/79; 477/86
[58] Field of Search ................. 477/78, 81, 91, 477/77, 79, 80, 86; 74/335

[56] References Cited

U.S. PATENT DOCUMENTS

| | | | |
|---|---|---|---|
| 4,527,447 | 7/1985 | Richards | 477/78 |
| 4,648,290 | 3/1987 | Dunkley et al. | 74/866 |
| 4,714,144 | 12/1987 | Speranza | 477/84 |
| 4,930,081 | 5/1990 | Dunkley et al. | 477/78 X |
| 5,441,462 | 8/1995 | Chan | 477/78 X |
| 5,441,464 | 8/1995 | Markyvech | 477/109 |
| 5,489,247 | 2/1996 | Markyvech et al. | 477/120 |
| 5,507,372 | 4/1996 | Boardman et al. | 477/169 X |

FOREIGN PATENT DOCUMENTS 0324553  3/1991  European Pat. Off. ........ F16D 25/14

Primary Examiner—Charles A. Marmor
Assistant Examiner—Peter T. Kwon
Attorney, Agent, or Firm—Howard D. Gordon

[57] ABSTRACT

A control system and method for a vehicular semi-automatic mechanical transmission system (10) having a clutch operator (30) and an overriding manual clutch control (3) for controlling engagement and disengagement of the master clutch (14) is provided. The control is effective to sense manual clutch disengagement during a downshift and to cease further attempts to cause synchronization by engine fuel manipulation (ES=IS=OS * $GR_T$) until a change in conditions is sensed.

12 Claims, 5 Drawing Sheets

DOWNSHIFT LOGIC FOR SEMI-AUTOMATIC MECHANICAL TRANSMISSION WITH MANUAL CLUTCH CONTROLLER

BACKGROUND OF THE INVENTION

1. Related Applications

This application claims priority from GB 9416840.8, filed Aug. 19, 1994.

2. Field of the Invention

The present invention relates to a control system and method for a semi-automatic mechanical transmission system, including a manually operated shift selector, for automatically controlling the changing or shifting of transmission gear ratios on a vehicle, while leaving the vehicle driver or operator some residual measure of control. In particular, the present invention relates to a control system and method for the semi-automatic control of a mechanical change gear transmission including means for automatically executing automatically determined and displayed allowable driver selected transmission ratio shifts, including automatic control of the vehicle master clutch. A clutch pedal is provided and the master clutch operation is automated in all but start-from-stop situations. The clutch pedal is effective to override the automated clutch operator to cause disengagement of the master clutch. More particularly, the present invention relates to a system and method for controlling a semi-automatic mechanical transmission wherein, during automatic implementation of a downshift, if the master clutch is manually disengaged, the logic will only command a single attempt to engage the target ratio and, if substantially synchronous conditions for engaging the target ratio are not achieved, will thereafter discontinue attempts to achieve synchronous conditions to downshift the transmission by engine speed modulation until (i) the master clutch is sensed as engaged or (ii) the vehicle comes to rest.

3. Description of the Prior Art

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear transmissions include transmissions wherein pressurized fluid is utilized to frictionally engage one or more members to other members or to a ground to achieve a selected gear ratio and automated mechanical transmissions utilizing electronic, hydraulic and/or pneumatic logic and actuators to engage and disengage mechanical (i.e., positive) clutches to achieve a desired gear ratio. Examples of such transmissions may be seen by reference to U.S. Pat. Nos. 3,961,546; 4,081,065; 4,361,060; 4,595,986; 5,050,079 and 5,109,729, the disclosures of which are incorporated herein by reference.

Many vehicle operators like to control the selection of the gear ratios, particularly since they can see and/or know the nature of the road ahead and/or of the load being carried. This requirement is satisfied by providing a semi-automatic mechanical transmission control wherein available gear ratios under existing operating conditions are displayed and automatic changing between a plurality of gear ratios is provided while normally permitting the driver to choose when to make a particular gear ratio change and whether to select the immediately consecutive ratio up or down or, by repetitive pulses in a given direction, to skip one or more ratios. Furthermore, the semi-automatic control system prohibits engagement of a driver selected higher ratio (i.e., an upshift) that would cause the engine speed to decrease below the idle speed (i.e., would cause stalling and/or over-stressing at low speeds of the engine) and of a lower ratio (i.e., a downshift) if such a change would cause over-speeding of the engine.

The semi-automatic transmission systems typically were provided with a non-manually controllable clutch actuator for controlling the master clutch during dynamic vehicle operation (usually above a predetermined ground speed) and a manually operated clutch pedal intended for start-from-stop operation and low-speed maneuvering.

Typically, the manual clutch control, usually a clutch pedal, was effective to override the non-manual actuator and cause master clutch disengagement, regardless of the position of the non-manual actuator, see European Pat. No. 0324553B1, the disclosure of which is incorporated herein by reference. Examples of the semi-automatic transmission systems and the controls therefor may be seen by reference to U.S. Pat. Nos. 4,648,290; 4,800,360; 4,930,081 and 4,930,078, the disclosures of which are incorporated herein by reference.

As is known in such systems, to allow engagement of a selected ratio, synchronous conditions must be established, i.e., input shaft speed must, within given limits, equal the product of output shaft speed multiplied by the target gear ratio (IS=OS * $GR_T$). With the master clutch fully engaged (i.e., no slip), engine speed (ES) equals input shaft speed, and to achieve synchronous conditions, especially for a downshift, the fueling of the engine was manipulated, with the master clutch engaged, so that engine speed substantially equaled the product of output shaft speed multiplied by target gear ratio (ES=IS=OS * $GR_T$). Upon achieving synchronous conditions, the positive jaw clutches associated with the target ratio were then engaged.

While the above-described semi-automatic mechanical transmission control does provide a very desirable semi-automatic control, the control was subject to improvement. In particular, in the prior art control, if the operator manually caused the master clutch to be disengaged during a downshift transient, the controller tended to repeatedly command acceleration of the engine in an attempt to cause synchronous conditions for engaging the target gear ratio. This resulted in rapid accelerations of the engine, which tended to be annoying as well as non-productive and wearing on the engine.

SUMMARY OF THE INVENTION

In accordance with the present invention, the drawbacks of the prior art semi-automatic mechanical transmission controls have been minimized or eliminated by the provision of a control and control method which, upon sensing manual master clutch disengagement during an attempted downshift, will cease further attempts to synchronize by engine speed manipulation to engage the selected target ratio until (i) the master clutch is reengaged and/or (ii) the vehicle is brought to a stop.

Accordingly, it is an object of the present invention to provide a new and improved control system/method for semi-automatic mechanical transmissions having a control for automatically determining allowable up and down shifts from a given gear ratio, for automatically displaying same, for automatically executing permissible gear ratio changes upon manual selection thereof, and wherein manual disengagement of the vehicle master clutch during a downshift transient will not result in repeated rapid flare-ups of the engine.

This and other objects and advantages of the present invention will become apparent from a reading of the following description of the preferred embodiments taken in connection with the attached drawings.

DESCRIPTION OF THE PREFERRED EMBODIMENT

Figure 1:
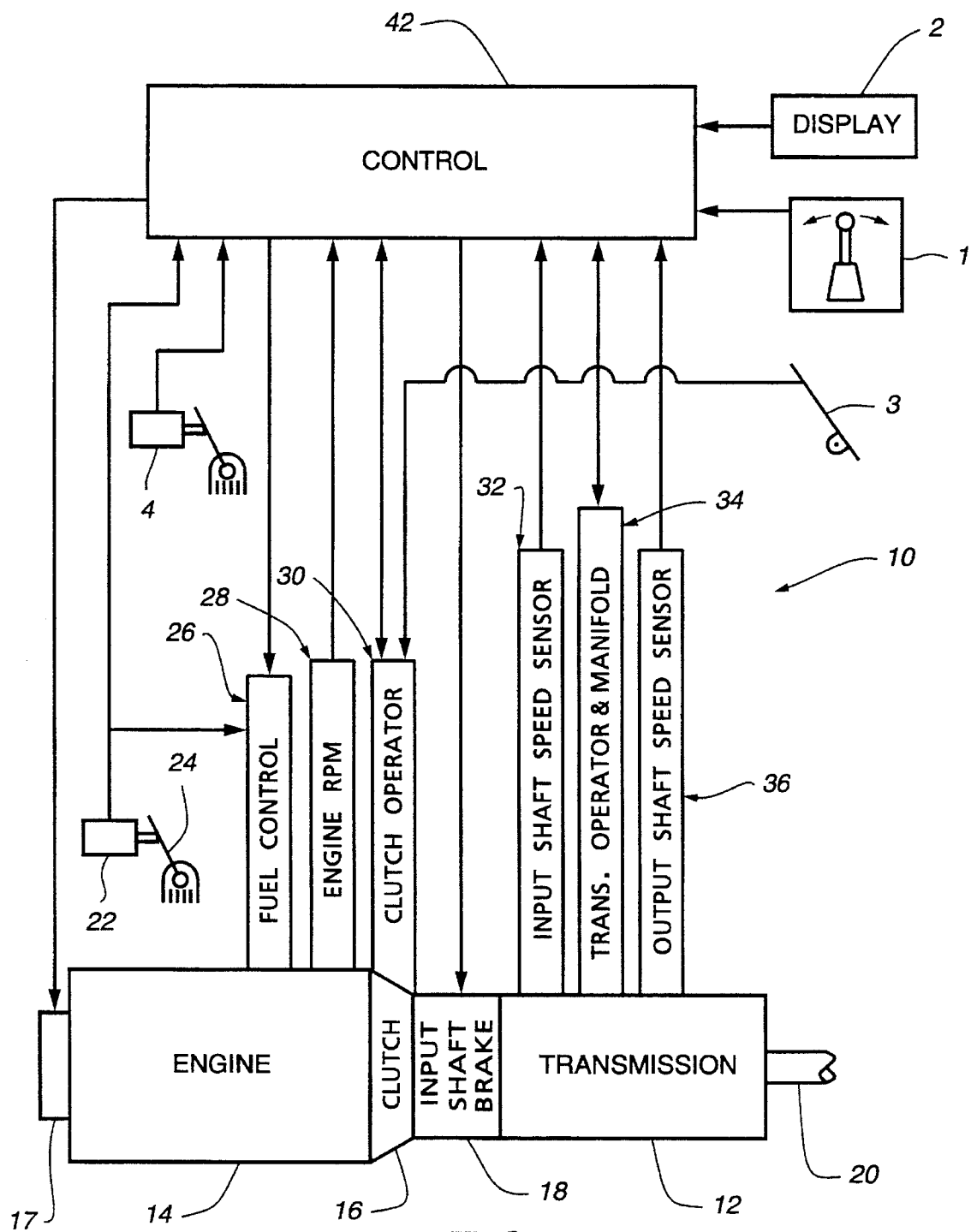
FIG. 1 is a schematic illustration of the semi-automatic mechanical change gear transmission system of the present invention.

In the present description of the preferred embodiment, certain terminology will be used for descriptive purposes only and is not intended to be limiting. The terms "upward," "downward," "rightward" and "leftward" refer to directions in the drawings to which reference is made. The terms "inward" and "outward" refer to directions towards and away from, respectively, the geometric center of the device, or portion thereof, being described. The above applies to derivatives of the terms above specifically mentioned and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter-type compound transmission" as used herein will designate a compound transmission wherein the auxiliary transmission is used to provide various selectable steps for subdivisions of the gear ratio selected in the main transmission portion. In a splitter-type compound transmission, the main transmission section is typically provided with relatively wide steps which are split or subdivided by the auxiliary section. The term "upshift" as used herein shall mean the shifting from a lower speed gear ratio into a higher speed gear ratio. The term "downshift" as used herein shall mean the shifting from a higher speed gear ratio to a lower speed gear ratio. The terms "low speed gear", "low gear" and/or "first gear" as used herein shall designate the gear ratio utilized for lowest forward speed operation in a transmission or transmission section (i.e., that set of gears having the highest ratio of reduction relative to the input shaft of the transmission).

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one and two ratios, respectively, from fourth and fifth speed, respectively, in the downshift direction.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196; 4,440,037 and 4,735,109, the disclosures of which are incorporated herein by reference. Transmissions of the type illustrated in above-mentioned U.S. Pat. No. 4,754,665 also may be advantageously used in connection with the present invention.

The semi-automatic transmission system to which the present invention is particularly advantageously related, is described and illustrated in aforementioned U.S. Pat. No. 4,648,290.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground speed and engine speed is an indication of transmission input shaft speed, and vice versa, especially if clutch 16 is non-slippingly engaged, while transmission output shaft speed is an indication of vehicle speed.

The throttle position sensor 24 may be of the type illustrated in U.S. Pat. No. 4,922,425, the disclosure of which is incorporated herein by reference, which will indicate the presence or absence of the operator's foot on the throttle pedal as well as displacement of the throttle pedal.

Devices, such as throttle position sensor assembly 22, for sensing the operator setting of a throttle pedal 24, or the like, and providing a signal proportional to, or at least indicative of, the monitored setting, and so called "remote fuel control" or "fly by wire" systems utilizing same, are known in the prior art and illustrated in U.S. Pat. Nos. 4,250,845; 4,305,359; 4,319,658 and 4,461,254, the disclosures of which are hereby incorporated by reference.

For control of vehicle SAMT systems 10, such as the systems illustrated in above-mentioned U.S. Pat. Nos. 4,648,290; 4,551,802; 4,361,060 and 4,081,065, it is important to provide accurate input signals to central processing unit, or control, 38, indicative of the operator's positioning of the throttle. The setting is usually expressed as a percentage of wide-open or full throttle with the idle position being zero percent (0%) and full or maximum throttle being one hundred percent (100%).

Figure 2:
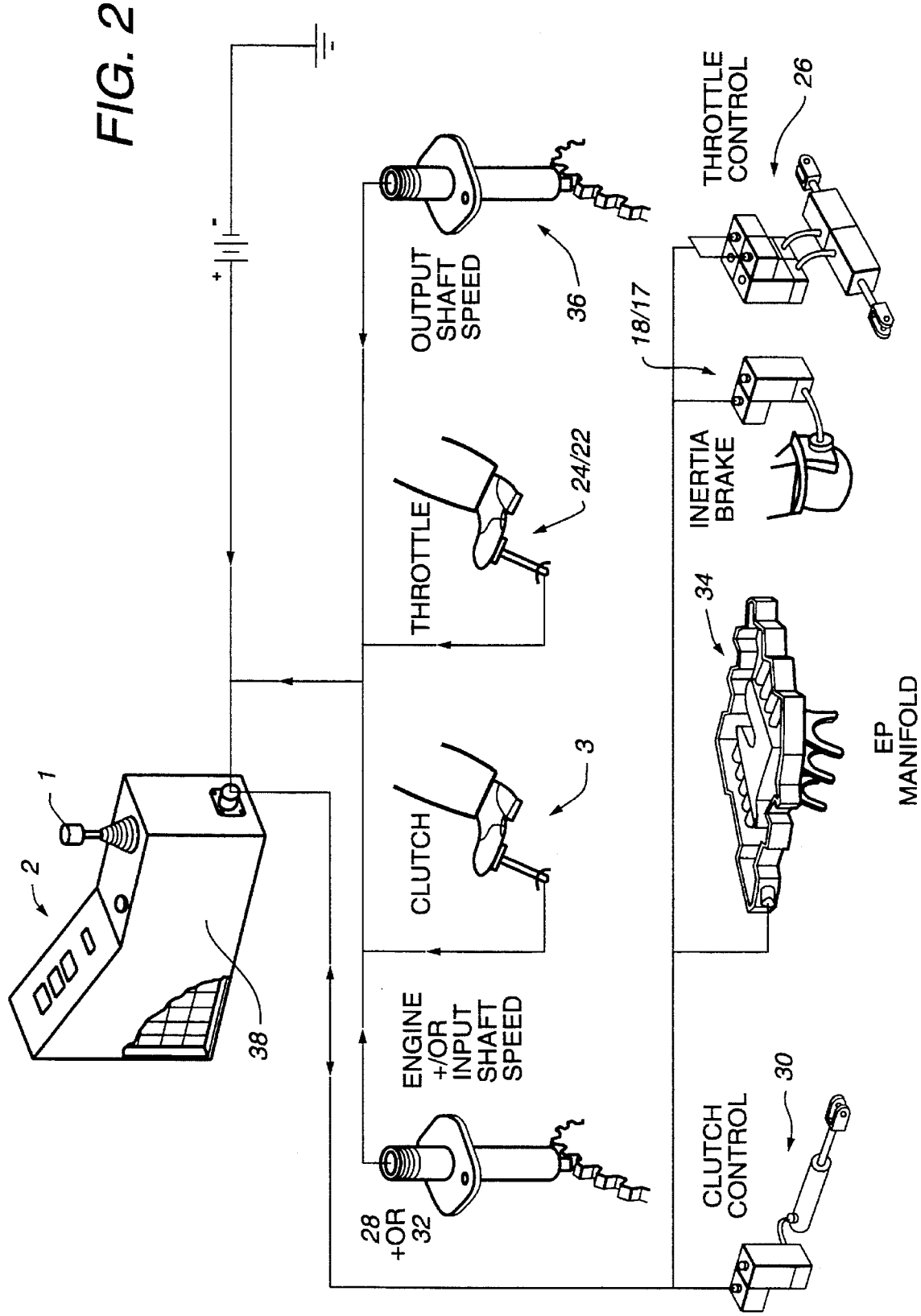
FIG. 2 is a schematic illustration of the control system of the semi-automatic transmission of the present invention.

Control logic circuits, sensors, and actuators for the transmission system 10 as disclosed in FIGS. 1 and 2, may be as disclosed in above-mentioned U.S. Pat. Nos. 4,361,060; 4,595,986; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The transmission operator 34 may be of the "X-Y" type as illustrated in U.S. Pat. Nos. 4,873,881 and 4,899,607, the disclosures of which are incorporated herein by reference.

The central processing unit also sends command output signals to the display 2, to be described in greater detail below. The semi-automatic transmission system 10 may additionally comprises a usual foot-operated manual clutch control 3 intended for use only for start from rest and/or low-speed creeping maneuvering situations. The control 38 receives signals indicative of manual clutch control 3 position and of actuation of the vehicle brakes 4. Clutch engagement/disengagement may be sensed by a position sensor or sensing if, over a period of time, input shaft and engine shaft speeds are equal (ES=IS?).

The central processing unit may be of the type illustrated in U.S. Pat. No. 4,595,986 and may incorporate fault detection and tolerance logic of the type illustrated in U.S. Pat. Nos. 4,849,899; 4,899,279 and 4,945,484, the disclosures of all of which are incorporated herein by reference.

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Engine 14 may be electronically controlled and may communicate over an electronic data link conforming to SAE J1922, SAE J1939 and/or ISO 9141 protocols.

Figure 3:
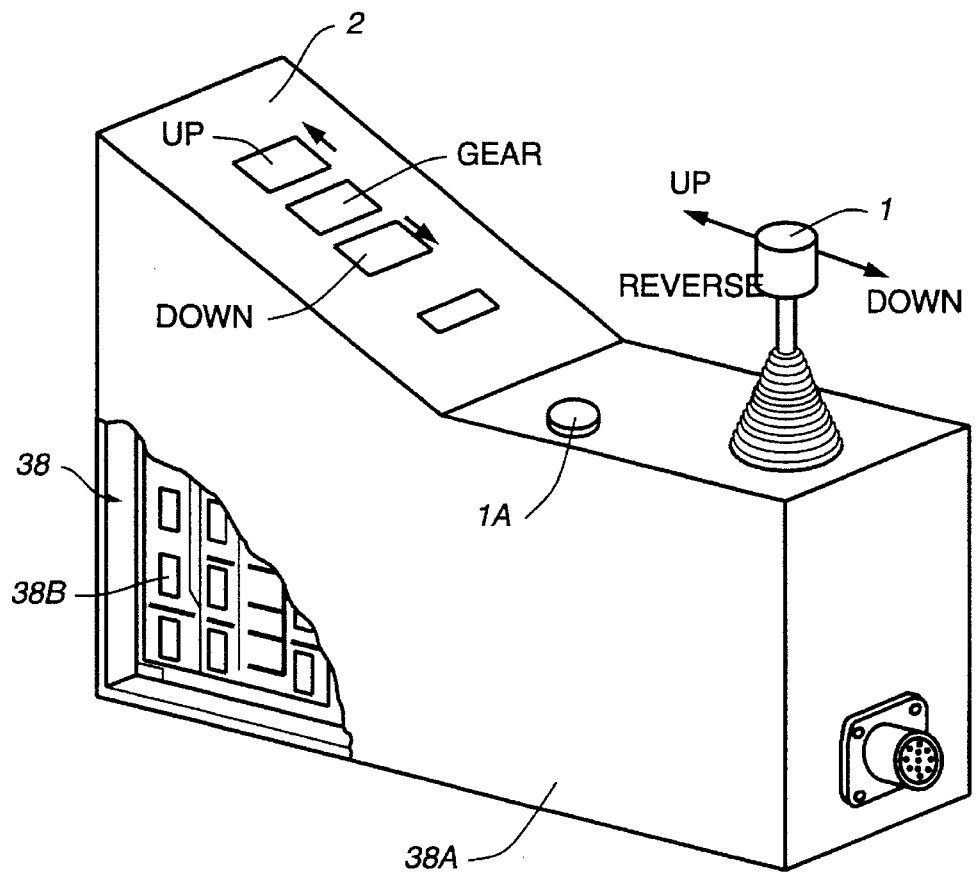
FIG. 3 is a perspective view of the driver's manual shift control and display device.

As may be seen by reference to FIG. 3, the central processing unit 38 may be contained in a box or housing 38A, which housing carries the display panel 2 having an upshift indicator display 2', a downshift indicator display 2", and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Figure 3B:
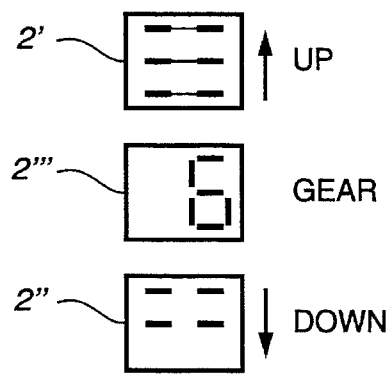
FIG. 3B is an enlarged view of a portion of the display illustrated in FIG. 3.

Referring to FIG. 3B, the display 2 includes upshift indicator section 2', downshift indicator section 2" and currently engaged gear ratio indicator section 2'''. As illustrated, the currently engaged gear ratio display section 2''' is presently displaying a "6" indicating that the vehicle transmission is operating in sixth gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh, eighth or ninth speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth or to fourth gear.

Briefly, the permissibility of a possible upshift or downshift is determined by comparing the expected engine speed at the completion of such an upshift or downshift, assuming a substantially constant vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate impermissible shift command even though synchronization of the mechanical jaw clutch elements could be obtained by the system.

To shift transmission 12, the driver moves lever 1 forward (for upshifts) and rearward (for downshifts) from the position illustrated in FIGS. 2 and 3. To select a single upshift (i.e., a shift to seventh gear), the operator will move lever 1 forward once and the lever will then return to the neutral or centered position under bias. If, in sixth gear as shown, the operator moves the lever forward three times in quick succession, then allowing its return to rest, he will skip two gears in effect, and achieve a skip shift directly into ninth speed (i.e., seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38.

The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation. Alternatively, a separate reverse selector may be provided.

To implement a shift, such as a downshift, the transmission will be urged to shift into neutral and will come out of gear upon a torque break, usually caused by momentary clutch disengagement or by throttle manipulation, see U.S. Pat. No. 4,850,236, the disclosure of which is incorporated herein by reference. The synchronous engine speed (ES=IS=OS * $GR_T$) for engaging the target ratio is then determined and with the master clutch engaged, the engine is controlled to achieve that speed. Assuming substantially constant or increasing vehicle speed, an downshift will require increased engine speed to achieve substantially synchronous conditions for engaging the positive jaw clutches associated with the target gear ratio ($GR_T$). Upon achieving or approaching synchronous, the jaw clutches are urged into engagement.

It is understood that a single control lever moveable forward and backward in a given direction to select a forward and reverse mode of operation, and then moveable in a transverse direction to select upshifts and downshifts either single or multiple, of the type disclosed in U.S. Pat. No. 4,442,730, the disclosure of which is hereby incorporated by reference, may be substituted for the control lever 1 illustrated.

The manual clutch controller, clutch pedal 3, is effective to override clutch operator 30 and cause master clutch 16 to be disengaged, regardless of the position of the operator 30, see aforementioned European Pat. No. 0324553B1. Accordingly, during a downshift transient, the engine may be disconnected from the input shaft, which prevents the input shaft from being accelerated to the synchronous speed thereof and may result in the controller rapidly cycling the engine through acceleration cycles in an attempt to achieve synchronous. This is possibly damaging to the engine and annoying to the operator, apart from being ineffective to complete a downshift into the target ratio.

To overcome this possibility, the present invention provides control logic whereby, during a downshift, as the engine is commanded to synchronous speed, if manual clutch disengagement is sensed, further attempts to manipulate engine speed to achieve synchronous conditions to engage the target ratio are prohibited until (i) master clutch engagement is sensed and/or (ii) the vehicle is brought to rest.

It is noted that, with the master clutch manually disengaged, engine braking of the vehicle is not possible and the operator has signaled, by manually disengaging the master clutch, that engine braking is not required.

Figure 4A:
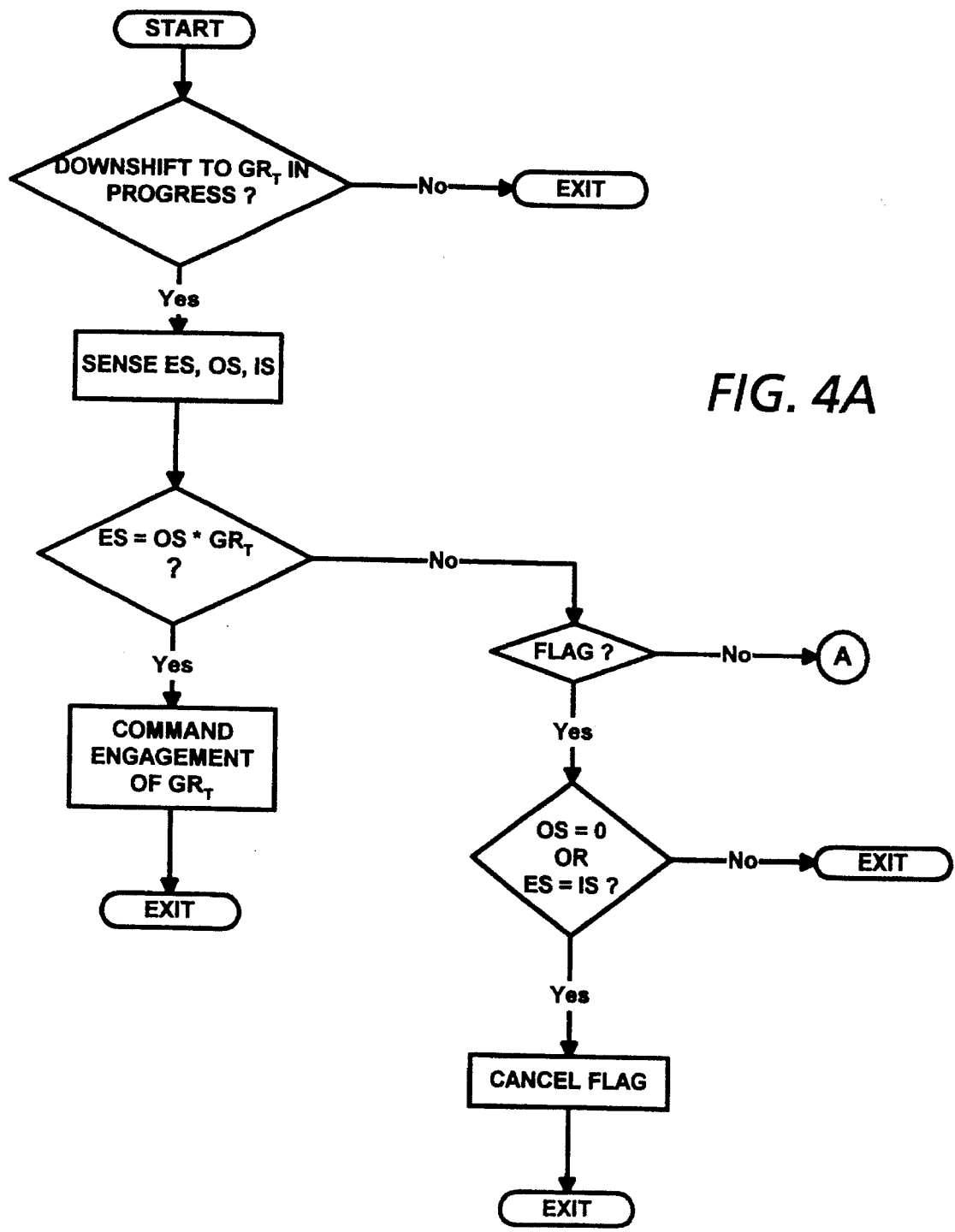
FIGS. 4A and 4B are schematic illustrations, in flow chart format, of the control system/method of the present invention.
Figure 4B:
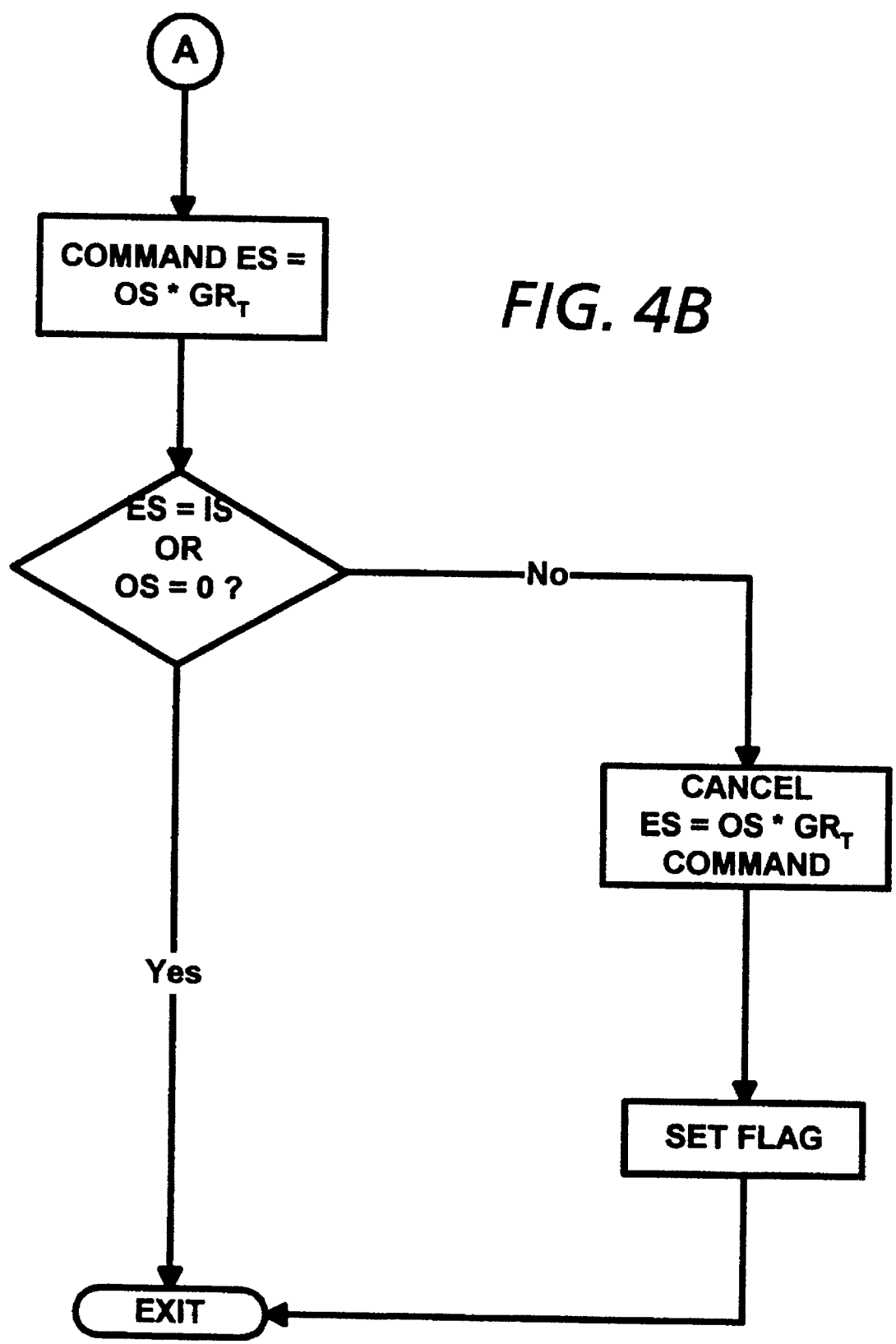

The control of the present invention is schematically illustrated in flow chart format in FIGS. 4A and 4B.

Accordingly, it may be seen that a control system/method for a semi-automated mechanical transmission is provided which is effective during automatic implementation of a downshift from an engaged ratio to a selected target ($GR_T$), to cause further attempts to complete the downshift, especially further attempts to achieve synchronous by engine manipulations, to be terminated upon sensing that the master clutch has been manually disengaged. Upon sensing manual master clutch disengagement, further attempts to complete the downshift will not be attempted until the clutch is reengaged and/or the vehicle is brought to rest.

Although the preferred embodiment of the present invention has been described with a certain degree of particularity, various changes to form and detail may be made without departing from the spirit and scope of the invention as hereinafter claimed.

I claim:
1. A method for controlling a vehicular at least partially automated mechanical transmission system (10) comprising a multiple-speed, change-gear mechanical transmission (12) drivingly connected to a fuel-controlled engine (14) by a master friction clutch (16), a non-manually controlled transmission operator (34), an engine fuel control (26) for controlling the supply of fuel to the engine, a manual clutch controller (3) for manually engaging and disengaging said master clutch and a controller (38) for receiving input signals and for processing same according to predetermined logic rules to issue command output signals to system operators, said method characterized by:

during implementation of a downshift into a target gear ratio ($GR_T$), including controlling engine speed to equal a synchronous value, sensing for manual disengagement of said master clutch, and if manual disengagement of said master clutch is sensed during implementation of a downshift, causing further implementation of said downshift by controlling engine speed to be suspended until enabling conditions occur, said enabling conditions including sensing at least one of reengagement of said master clutch and vehicle speed failing to exceed a reference value (OS<REF?).

2. The method of claim 1 wherein said input signals include signals indicative of engine speed (ES) and transmission input shaft speed (IS), and engagement and disengagement of said master clutch is sensed by comparing the values of said signals.

3. The method of claim 1 wherein said transmission system further comprises a non-manually controlled clutch operator (30) responsive to command output signals from said controller for engaging and disengaging said master clutch, said manual clutch controller effective to override said clutch operator and cause disengagement of said master clutch.

4. The method of claim 1 wherein said transmission system further comprises a non-manually controlled clutch operator (30) responsive to command output signals from said controller for engaging and disengaging said master clutch, said manual clutch controller effective to override said clutch operator and cause disengagement of said master clutch.

5. The method of claim 1 wherein said transmission system further comprises a non-manually controlled clutch operator (30) responsive to command output signals from said controller for engaging and disengaging said master clutch, said manual clutch controller effective to override said clutch operator and cause disengagement of said master clutch.

6. The method of claim 2 wherein said transmission system further comprises a non-manually controlled clutch operator (30) responsive to command output signals from said controller for engaging and disengaging said master clutch, said manual clutch controller effective to override said clutch operator and cause disengagement of said master clutch.

7. A control system for controlling shifting of a vehicular automated mechanical transmission system (10) comprising a multiple-speed, change-gear mechanical transmission (12) drivingly connected to a fuel-controlled engine (14) by a master friction clutch (16), a non-manually controlled transmission operator (34), an engine fuel control (26) for controlling the supply of fuel to the engine, a manual clutch controller (3) for manually engaging and disengaging said master clutch, a controller (38) for receiving input signals and for processing same according to predetermined logic rules to issue command output signals to system operators, said control system characterized by:

means effective, during implementation of a downshift into a target gear ratio ($GR_T$), including controlling engine speed to equal a synchronous value, for sensing for manual disengagement of said master clutch, and means effective, if manual disengagement of said master clutch is sensed during implementation of a downshift, for causing further implementation of said downshift by controlling engine speed to be suspended until enabling conditions occur, said enabling conditions including sensing at least one of reengagement of said master clutch and vehicle speed failing to exceed a reference value (OS<REF?).

8. The control system of claim 7 wherein said input signals include signals indicative of engine speed (ES) and transmission input shaft speed (IS), and engagement and disengagement of said master clutch is sensed by comparing the values of said signals.

9. The control system of claim 7 wherein said transmission system further comprises a non-manually controlled clutch operator (30) responsive to command output signals from said controller for engaging and disengaging said master clutch, said manual clutch controller effective to override said clutch operator and cause disengagement of said master clutch.

10. The control system of claim 7 wherein said transmission system further comprises a non-manually controlled clutch operator (30) responsive to command output signals from said controller for engaging and disengaging said master clutch, said manual clutch controller effective to override said clutch operator and cause disengagement of said master clutch.

11. The control system of claim 7 wherein said transmission system further comprises a non-manually controlled clutch operator (30) responsive to command output signals from said controller for engaging and disengaging said master clutch, said manual clutch controller effective to override said clutch operator and cause disengagement of said master clutch.

12. The control system of claim 8 wherein said transmission system further comprises a non-manually controlled clutch operator (30) responsive to command output signals from said controller for engaging and disengaging said master clutch, said manual clutch controller effective to override said clutch operator and cause disengagement of said master clutch.

* * * * *